(12) United States Patent
Kawaguchi

(10) Patent No.: US 11,394,839 B2
(45) Date of Patent: Jul. 19, 2022

(54) STORAGE MEDIUM STORING INFORMATION PROCESSING PROGRAM, INFORMATION PROCESSING APPARATUS, AND INFORMATION PROCESSING METHOD

(71) Applicant: BROTHER KOGYO KABUSHIKI KAISHA, Nagoya (JP)

(72) Inventor: Masafumi Kawaguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 90 days.

(21) Appl. No.: 16/923,296

(22) Filed: Jul. 8, 2020

(65) Prior Publication Data

US 2021/0067642 A1 Mar. 4, 2021

(30) Foreign Application Priority Data

Aug. 30, 2019 (JP) .............................. JP2019-158263

(51) Int. Cl.
*H04N 1/00* (2006.01)

(52) U.S. Cl.
CPC ..... *H04N 1/00453* (2013.01); *H04N 1/00424* (2013.01); *H04N 1/00456* (2013.01); *H04N 1/00458* (2013.01)

(58) Field of Classification Search
CPC ........... H04N 1/00453; H04N 1/00424; H04N 1/00456; H04N 1/00458
See application file for complete search history.

(56) References Cited

U.S. PATENT DOCUMENTS

| | | | | |
|---|---|---|---|---|
| 6,532,077 B1 * | 3/2003 | Arakawa | .................. | H04N 1/40 358/1.13 |
| 8,913,285 B1 * | 12/2014 | Neubrand | ............ | H04N 1/3873 358/1.9 |
| 2003/0217034 A1 * | 11/2003 | Shutt | ................... | G06F 21/6218 |
| 2007/0067798 A1 * | 3/2007 | Wroblewski | ......... | H04N 21/482 725/37 |

(Continued)

FOREIGN PATENT DOCUMENTS

| | | | |
|---|---|---|---|
| JP | 2006-270200 A | 10/2006 |
| JP | 2015-198288 A | 11/2015 |

(Continued)

*Primary Examiner* — Justin S Lee
(74) *Attorney, Agent, or Firm* — Scully, Scott, Murphy & Presser, P.C.

(57) ABSTRACT

A set of program instructions, when executed by a controller of an information processing apparatus, causes the information processing apparatus to: display, on a display of the information processing apparatus, a scan result screen formed by sequentially arranging images of documents scanned by an image scanner at respective ones of M×N display frames, the M×N display frames including M display frames arranged vertically and N display frames arranged horizontally; display an insertion icon at a left-side position with respect to a center of a display frame in a horizontal direction, the display frame being one of the M×N display frames; and in response to an operation of the insertion icon, control the image scanner to scan an image of a new document, and insert the scanned image to a position that is immediate left of the display frame corresponding to the operated insertion icon.

16 Claims, 10 Drawing Sheets

(56) References Cited

U.S. PATENT DOCUMENTS

| | | | |
|---|---|---|---|
| 2007/0297017 A1* | 12/2007 | Kashioka | H04N 1/00474 358/448 |
| 2010/0328739 A1* | 12/2010 | Saida | H04N 1/00448 358/498 |
| 2011/0058231 A1* | 3/2011 | Oshima | H04N 1/00795 358/474 |
| 2011/0292438 A1* | 12/2011 | Inami | H04N 1/00411 358/1.15 |
| 2013/0208999 A1* | 8/2013 | Miyata | H04N 1/3873 382/309 |
| 2014/0036279 A1* | 2/2014 | Tohki | G03G 15/5095 358/1.2 |
| 2014/0068450 A1* | 3/2014 | Wolfe | G06F 3/04842 715/738 |
| 2014/0118769 A1* | 5/2014 | Adachi | H04N 1/32797 358/1.13 |
| 2015/0281478 A1 | 10/2015 | Okamoto | |
| 2015/0281481 A1* | 10/2015 | Mizutani | H04N 1/00392 358/1.13 |
| 2016/0054908 A1* | 2/2016 | Vegesna | G06F 3/04817 715/716 |
| 2016/0227062 A1 | 8/2016 | Miyazaki et al. | |
| 2017/0147168 A1* | 5/2017 | Yamanishi | G06F 3/04845 |
| 2018/0048777 A1 | 2/2018 | Murakami | |
| 2018/0139341 A1* | 5/2018 | Shinohara | H04N 1/6008 |
| 2019/0121864 A1* | 4/2019 | Okamoto | G06F 16/23 |
| 2019/0149680 A1* | 5/2019 | Ikeda | H04N 1/00824 358/1.15 |
| 2019/0245993 A1* | 8/2019 | Murakami | H04N 1/00411 |

FOREIGN PATENT DOCUMENTS

| | | |
|---|---|---|
| JP | 2016-021685 A | 2/2016 |
| JP | 2016-143969 A | 8/2016 |
| JP | 2018-026658 A | 2/2018 |

* cited by examiner

STORAGE MEDIUM STORING INFORMATION PROCESSING PROGRAM, INFORMATION PROCESSING APPARATUS, AND INFORMATION PROCESSING METHOD

CROSS REFERENCE TO RELATED APPLICATIONS

This application claims priority from Japanese Patent Application No. 2019-158263 filed Aug. 30, 2019. The entire content of the priority application is incorporated herein by reference.

TECHNICAL FIELD

This disclosure relates to a storage medium storing an information processing program executable on an information processing apparatus configured to communicate with an image scanner that reads an image of a document, an information processing apparatus, and an information processing method.

BACKGROUND

Upon receiving scan data from a scanner, an information processing apparatus (PC) capable of communicating with the scanner displays a preview screen that displays a list of images based on the received scan data on a panel to display a successive scan icon in the preview screen and insert images based on newly-received scan data at a position to which the successive scan icon has been dragged.

SUMMARY

According to one aspect, this specification discloses a non-transitory computer-readable storage medium storing a set of program instructions for an information processing apparatus configured to communicate with an image scanner. The set of program instructions, when executed by a controller of the information processing apparatus, causes the information processing apparatus to: display, on a display of the information processing apparatus, a scan result screen formed by sequentially arranging images of documents scanned by the image scanner at respective ones of MXN display frames, the M×N display frames including M display frames arranged vertically and N display frames arranged horizontally; display an insertion icon at a left-side position with respect to a center of a display frame in a horizontal direction, the display frame being one of the M×N display frames; and in response to an operation of the insertion icon, control the image scanner to scan an image of a new document, and insert the scanned image to a position that is immediate left of the display frame corresponding to the operated insertion icon.

According to another aspect, this specification also discloses an information processing apparatus. The information processing apparatus includes a communication interface configured to be connected to an image scanner, a display, a controller, and a memory storing set of instructions. The instructions, when executed by the controller, cause the information processing apparatus to: display, on the display, a scan result screen formed by sequentially arranging images of documents scanned by the image scanner at respective ones of M×N display frames, the M×N display frames including M display frames arranged vertically and N display frames arranged horizontally; display an insertion icon at a left-side position with respect to a center of a display frame in a horizontal direction, the display frame being one of the M×N display frames; and in response to an operation of the insertion icon, control the image scanner to scan an image of a new document, and insert the scanned image to a position that is immediate left of the display frame corresponding to the operated insertion icon.

According to still another aspect, this specification also discloses an information processing method. The information processing method includes: displaying, on a display of an information processing apparatus, a scan result screen formed by sequentially arranging images of documents scanned by an image scanner at respective ones of M×N display frames, the M×N display frames including M display frames arranged vertically and N display frames arranged horizontally, the image scanner being connected to a communication interface of the information processing apparatus for performing communication; displaying an insertion icon at a left-side position with respect to a center of a display frame in a horizontal direction, the display frame being one of the M×N display frames; and in response to an operation of the insertion icon, controlling the image scanner to scan an image of a new document, and inserting the scanned image to a position that is immediate left of the display frame corresponding to the operated insertion icon.

BRIEF DESCRIPTION OF THE DRAWINGS

Embodiments in accordance with this disclosure will be described in detail with reference to the following figures wherein.

DETAILED DESCRIPTION

In the above-mentioned information processing apparatus, there is a room for improvement in operability of inserting an image based on newly-received scan data into the preview screen.

In view of the foregoing, an example of an objective of this disclosure is to provide technique for further improving operability of inserting, into a scan result screen, an image of a document that is newly-scanned by an image scanner.

An embodiment of this disclosure will be described in detail while referring to the accompanying drawings.

Figure 1:
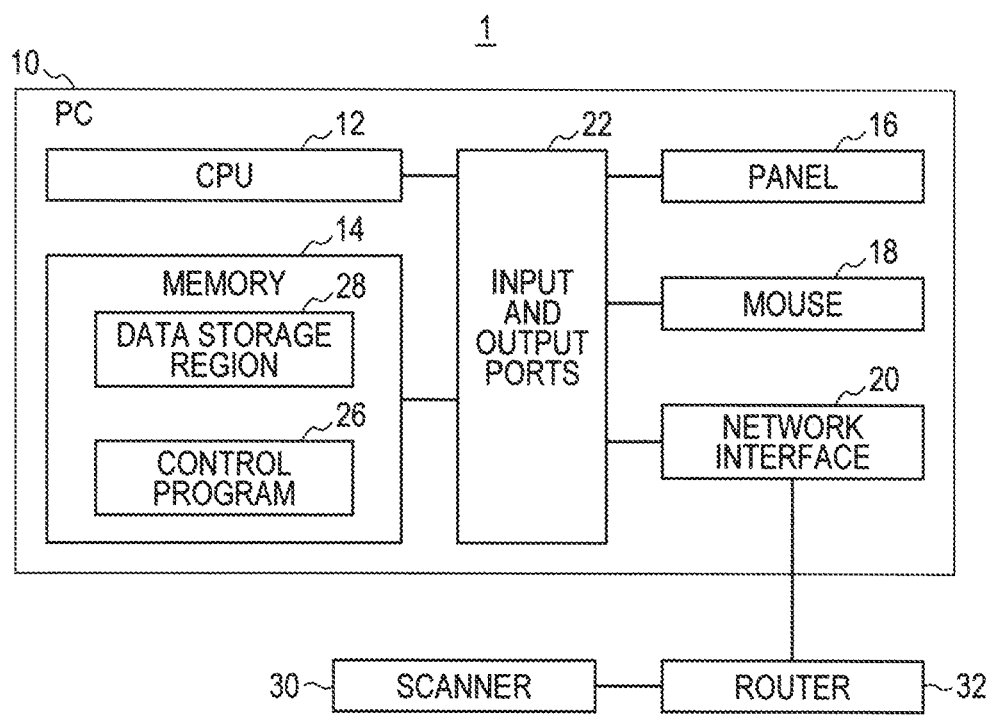
FIG. 1 is a block diagram showing the control configuration of a communication system according to an embodiment of this disclosure.

As shown in FIG. 1, a communication system 1 includes a PC (Personal Computer) 10, a scanner 30, and a router 32.

The PC 10 mainly includes a central processing unit (CPU) 12, a memory 14, a panel 16, a mouse 18, and a network interface (I/F) 20. These components 12, 14, 16, 18, and 22 communicate with each other through input and output ports 22.

The network interface 20 communicates with an external device through the router 32, and in the present embodiment, is connected to the scanner 30 through the router 32. Due to this, the PC 10 transmits and receives various pieces of data to and from the scanner 30.

The panel 16 has a display surface and displays images and so on based on image data on the display surface. The mouse 18 moves a cursor displayed on the display surface of the panel 16 and receives a drag operation, a click operation, and so on of a user.

The CPU 12 executes processing according to a control program 26 in the memory 14. The control program 26 is a program for causing the scanner 30 to execute scan processing.

The memory 14 is configured such that a random access memory (RAM), a read only memory (ROM), a flash memory, a hard disk drive (HDD), and a buffer included in the CPU 12 are incorporated therein. The memory 14 includes a data storage region 28. The data storage region 28 is a region in which scan data acquired from the scanner 30 and data and so on necessary for execution of the control program 26 are stored.

In the communication system 1, the scanner 30 executes scan processing according to a scan command from the PC 10, and the scan data generated by the scan processing is transmitted to the PC 10. In this case, when one or more documents are scanned collectively by the scanner 30, scan data of these one or more documents are stored in the PC 10 as a group of scan data (hereinafter sometimes referred to as "scan data group"). In the present embodiment, one document means one sheet of document such as paper.

When a user wants to add new scan data to the scan data group, scan processing is performed again. That is, it is assumed that one or more documents are scanned and scan data of the one or more documents are stored in the PC 10. There is a case where it is desired that scan data of a new document is stored together with the scan data of the document scanned earlier. In this case, new scanning is performed subsequently to previous scanning, and the scan data of a new document and the scan data of a document scanned earlier are stored in association with each other in the data storage region 28.

FIGS. 2A to 2D show examples of a scan-data saving screen displayed on the panel 16. A scan-data saving screen 100 shown in FIG. 2A mainly includes a preview display region 110 for displaying a preview of a scan data group and a saving/sharing instruction region 120 for displaying a plurality of buttons for instructing saving/sharing of the scan data group. Scan-data saving screens 101, 102, 100' shown in FIGS. 2B, 2C, and 2D have a main screen arrangement similar to that of the scan-data saving screen 100.

Figure 2A:
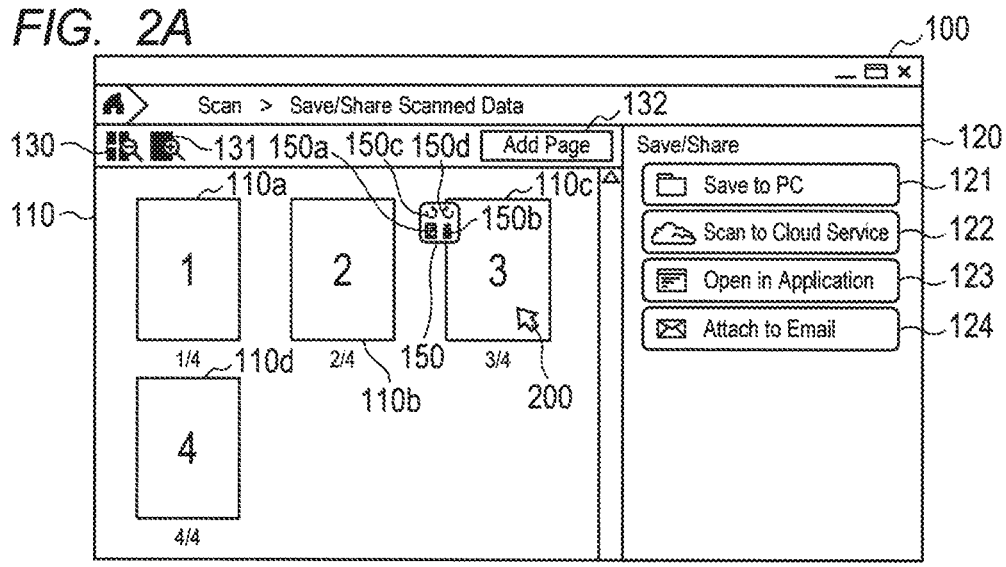
FIGS. 2A to 2D show examples of a scan-data saving screen displayed on a panel shown in FIG. 1.

In the example of FIG. 2A, a scan data group includes four scan data. That is, the four scan data are obtained with the scanner 30 by scanning a plurality of documents and by storing four scan data in the data storage region 28 of the PC 10. Thus, display frames 110a to 110d for displaying the respective four scan data are formed in the preview display region 110, and images associated with the respective scan data are displayed in the respective display frames 110a to 110d. A number of display frames corresponding to the number of scan data are formed, and in the present embodiment, no vacant display frame in which no image is displayed is present.

A reduction icon 130 for instructing reduction of the size of the display frames 110a to 110d and an enlargement icon 131 for instructing enlargement of the size of the display frames 110a to 110d are displayed on the preview display region 110. An Add Page (additional scan) button 132 for instructing additional scan is also displayed on the preview display region 110.

A "Save to PC" button 121, a "Save to Cloud Service" button 122, an "Open in Application" button 123, and an "Attach to Email" button 124 are displayed in the saving/sharing instruction region 120.

The "Save to PC" button 121 is a button for issuing an instruction to save a scan data group (that is, in the example of FIG. 2A, a scan data group made up of respective scan data based on respective images displayed in the display frames 110a to 110d) in the data storage region 28 (for example, a HDD) of the PC 10. The "Save to Cloud Service" button 122 is a button for issuing an instruction to save a scan data group in a server (not illustrated) connected through the network interface 20. The "Open in Application" button 123 is a button for issuing an instruction to start up an application for performing editing such as data conversion on the scan data group and hand over the scan data group to the application. The "Attach to Email" button 124 is a button for issuing an instruction to attach a scan data group to an email and send the email to a destination.

A cursor 200 that moves vertically, horizontally, and so on, on the display surface of the panel 16 according to an operation of the mouse 18 is displayed on the display surface of the panel 16. FIG. 2A shows a state in which the cursor 200 is located in the display frame 110c. In this manner, in the present embodiment, a state in which a user positions the cursor 200 in the display frame 110c and no other operation is performed on the display frame 110c will be referred to as "mouseover". That is, such a cursor operation of a user is expressed that "the image of the display frame 110c is moused over". The "mouseover" is a general term, and a user may "mouseover" on a display object (specifically, the reduction icon 130, the enlargement icon 131, and various buttons 121 to 124, 132) other than the display frames 110a to 110d. However, in the present embodiment, since a user positions the cursor 200 over display objects other than the display frames 110a to 110d in order to perform operations (such as click), the expression "mouseover" will not be used for those display objects.

As shown in FIG. 2A, when the image of the display frame 110c is moused over, an icon group 150 is displayed at a left-side position with respect to the center of the display frame 110c. The icon group 150 is preferably located on (that is, overlaps) the left side (left edge) of the display frame 110c, but need not fit within the display frame 110c. However, if the entire icon group 150 is displayed outside the display frame 110c, it would be difficult to understand which of the display frames 110a to 110d the icon group 150 corresponds to. Thus, it is preferable that at least part of the icon group 150 overlaps the display frame 110c.

The icon group 150 includes an insertion icon 150a, a deletion icon 150b, a counterclockwise rotation icon 150c, and a clockwise rotation icon 150d.

The insertion icon 150a is an icon for issuing an instruction to provide a new display frame to the left of a display frame (that is, in FIG. 2A, the display frame 110c) in which the icon group 150 is being displayed and to display an image associated with the scan data of a new document in the display frame. When the insertion icon 150a is operated, the PC 10 (the CPU 12) transmits a scan command to the scanner 30 through the network interface 20 and the router 32. In response to this, the scanner 30 scans a new document and transmits the scan data thereof to the PC 10, and the PC 10 receives the scan data, generates a new display frame, and displays an image associated with the received scan data in the display frame.

The deletion icon 150b is an icon for issuing an instruction to delete a display frame (that is, the display frame 110c in FIG. 2A) on which the icon group 150 is being displayed. When the deletion icon 150b is operated in FIG. 2A, the CPU 12 deletes the display frame 110c and deletes the scan data based on the image displayed in the display frame 110c from the scan data group.

The counterclockwise rotation icon 150c is an icon to instruct a display frame on which the icon group 150 is displayed (that is, the display frame 110c in FIG. 2A) to rotate counterclockwise by 90 degrees, for example. The clockwise rotation icon 150d is an icon to instruct the display frame 110c to rotate clockwise by 90 degrees, for example.

The order of the arrangement of the respective icons 150a to 150d included in the icon group 150 is not limited to that of FIG. 2. However, it is preferable that the insertion icon 150a and the deletion icon 150b be displayed while being adjacent to each other (the deletion icon 150b is displayed to immediate right of the insertion icon 150a) and the counterclockwise rotation icon 150c and the clockwise rotation icon 150d be displayed while being adjacent to each other because improved operability is provided for the respective icons 150a to 150d. Thus, the icon group may be configured so that the counterclockwise rotation icon 150c and the clockwise rotation icon 150d are displayed below the insertion icon 150a and the deletion icon 150b because the operability for the respective icons 150a to 150d is unchanged.

Unlike the insertion icon 150s, the Add Page button 132 is a button to provide a new display frame after the display frame displayed at the last position (the display frame 110d in FIG. 2A) and to display an image according to scan data of the new document in the display frame. When the additional scan button 132 is pressed, the PC 10 (the CPU 12) sends a scan instruction to the scanner 30 as when the insertion icon 150a is operated. The subsequent processing is the same as when the insertion icon 150a is operated, and thus the details will not be further described. However, the position at which the display frame is newly generated is different from that when the insertion icon 150a is operated.

Figure 3A:
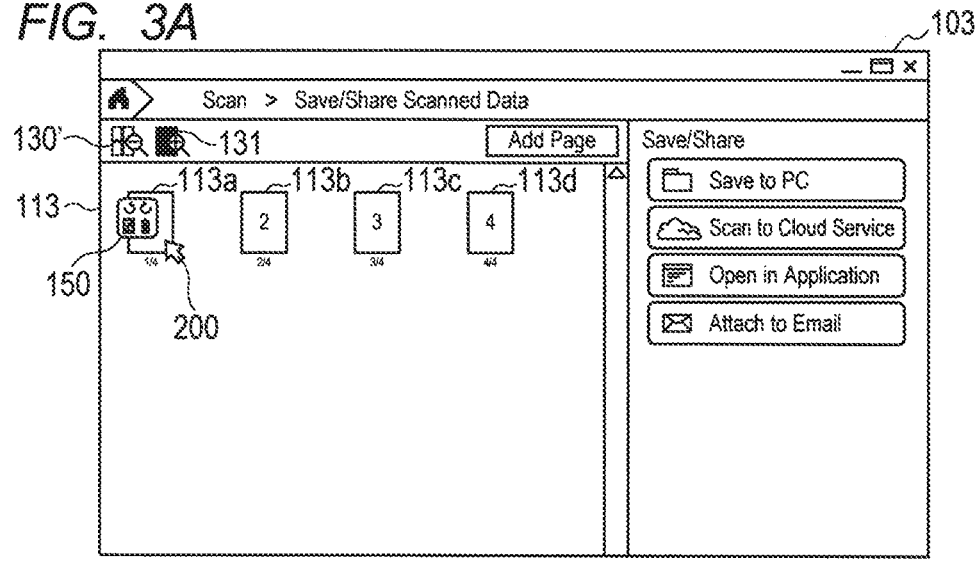
FIGS. 3A to 3C show other examples of the scan-data saving screen different from the scan-data saving screen shown in FIGS. 2A to 2D.

The reduction icon 130 is an icon to provide an instruction to reduce the size of each display frame as described above. Assume that, when the display frames 110a to 110d are displayed within the preview display region 110 of FIG. 2A, for example, a user operates the reduction icon 130 to reduce the sizes of the respective display frames 110a to 110d to the minimum size. As shown in FIG. 3A, this instruction causes the display frames 113a to 113d reduced to the minimum size to be displayed within the preview display region 113. The display frames 110a to 110d are displayed in two rows within the preview display region 110 of FIG. 2A, while the display frames 113a to 113d are displayed in one row within the preview display region 113 of FIG. 3A. In FIG. 3A, the display frames 113a to 113d are reduced to the minimum size. Thus, the reduction icon 130' is displayed in grayscale so that further reduction of the display frames 113a to 113d is prevented.

Figure 2B:
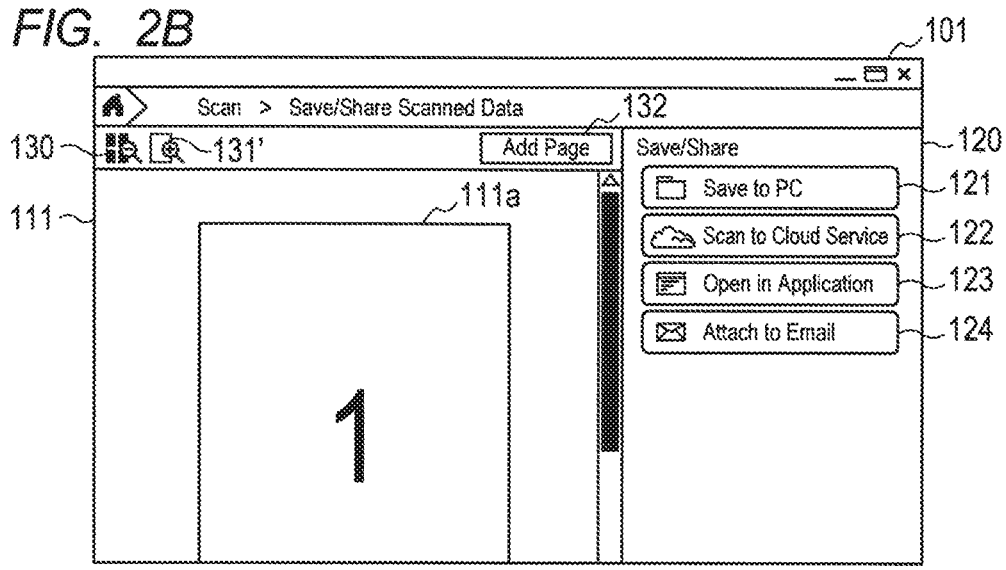

The enlargement icon 131 is an icon to provide an instruction to enlarge the size of each display frame as described above. When the enlargement icon 131 is operated, the CPU 12 displays the display frame in an enlarged manner as shown in FIG. 2B. Note that FIG. 2B does not show a state of the enlargement of the display frames 110a to 110d within the preview display region 110 of FIG. 2A, but shows the state of the enlargement from a state where only one display frame 110a is displayed within the preview display region 110. Thus, the preview display region 111 of FIG. 2B displays only an enlarged display frame 111a. Since the display frame 111a is enlarged to the maximum size, the enlargement icon 131' is displayed in grayscale so as to prevent an instruction for further enlargement.

The preview display region 110 (for example, the preview display regions 111 and 112 and any other preview display regions) can be enlarged or reduced by operating a cursor 200. The enlargement or reduction of such a region has been generally performed. Thus, no further description will be provided for the method of operating the cursor 200 in order to enlarge or reduce the region or the configuration to enlarge or reduce the region. When it is instructed that the preview display region 110 be enlarged, then the display region of the preview display region 110 is enlarged. This consequently causes the first row (that is, the row of the display frames 110a to 110c) to include therein a space in which a display frame can be displayed. Specifically, the right end of the preview display region 110 and the right side of the display frame 110c may have therebetween a space in which the next display frame 110d can be displayed. In this case, the display frame 110d is displayed in the first row at the right side of the display frame 110c.

A display frame displayed within the preview display region has a size set to a default size unless a change in setting is made. However, there is a function to enlarge, when a small number of display frames is displayed relative to the size of the preview display region (for example, when the preview display region 110 of FIG. 2A includes only one the display frame 111a, for example), the display frame 11a of a default size to have a size optimal for the display on the preview display region 110 and display the enlarged display frame 111a (hereinafter referred to as "automatic resizing function"). The automatic resizing function can be enabled or disabled by the user. When the control program 26 has the automatic resizing function and the user enables this function, and when the preview display region 110 includes only one display frame 110a, the CPU 12 displays the enlarged display frame 110a in the same manner as the display frame 111a within the preview display region 111 of FIG. 2B. However, the display frame 110a is not always enlarged to the maximum size as in FIG. 2B.

Figure 2C:
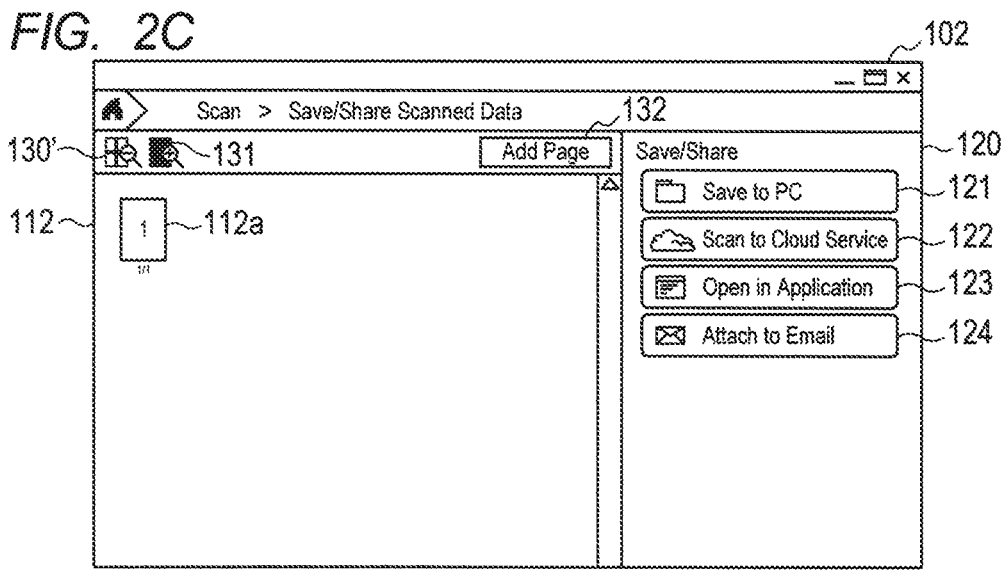
Figure 2D:
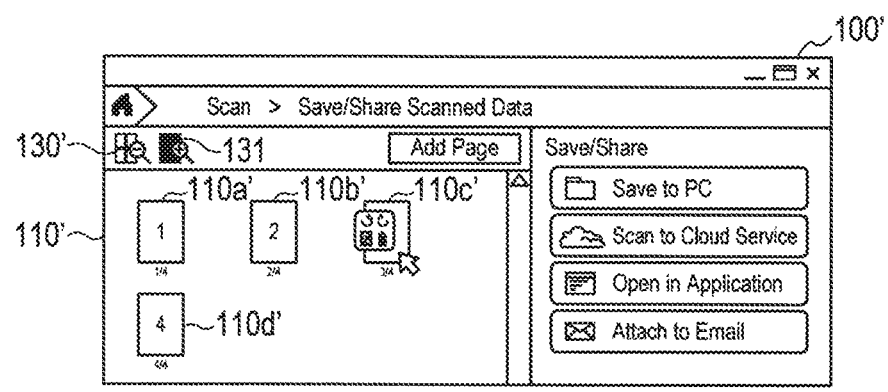

It is assumed that the user enables the automatic resizing function and, in a state where the display frames 110a to 110d are displayed within the preview display region 110 of FIG. 2A, the user operates the cursor 200 to reduce the screen size of the preview display region 110. In this case, as shown in FIG. 2D, as the user reduces the screen size of the preview display region 110, the CPU 12 resizes the display frames so that display frames 110a' to 110d' smaller than the display frames 110a to 110d are displayed within a preview display region 110' in the scan-data saving screen 100'.

As shown in FIG. 2A, assume that, in a state where the display frames 110a to 110d are displayed within the preview display region 110, the user operates the reduction icon 130 and reduces the display frames 110a to 110d to the minimum size. Thereafter, while sequentially displaying the icon group 150 on the display frames 110b to 110d, the user operates (clicks) the deletion icon 150b in the icon group 150 to sequentially delete the display frames 110b to 110d and leave only the display frame 110a. In this case, even when the automatic resizing function is enabled, the CPU 12 does not enlarge the remaining display frame 110a. FIG. 2C illustrates this display status. As shown in FIG. 2C, the preview display region 112 includes only the display frame 112a reduced to the minimum size. In this way, the number of displayed frames on each row and in each column is unchanged before and after the deletion. In other words, the size of the remaining display frame 112a is kept unchanged before and after the deletion. If the automatic resizing function is used to automatically enlarge the size of the remaining display frame 110a as shown in FIG. 2B, it is difficult to know whether only one display frame 110a has been displayed from the beginning or some display frames have been deleted to leave only one display frame. Thus, even when the automatic resizing function is enabled, the CPU 12 does not use the automatic resizing function when deleting display frames.

FIG. 3A illustrates a scan-data saving screen 103 when the display frames 110a to 110d within the preview display region 110 of FIG. 2A are reduced to the minimum size as described above. FIG. 3A is different from FIG. 2A in that the moused-over display frame is not the display frame 113c but the display frame 113a.

As shown in FIG. 3A, since the display frame 113a is moused over, the icon group 150 is displayed over the left side (the left edge) of the display frame 113a. As is clear from the comparison between FIG. 2A and FIG. 3A, there is no difference in size between the icon group 150 displayed over the display frame 110c and the icon group 150 displayed over the display frame 113a. Specifically, the CPU 12 provides a control processing by which the display frames 110a to 110d am reduced, but the icon groups 150 are not reduced.

Figure 3B:
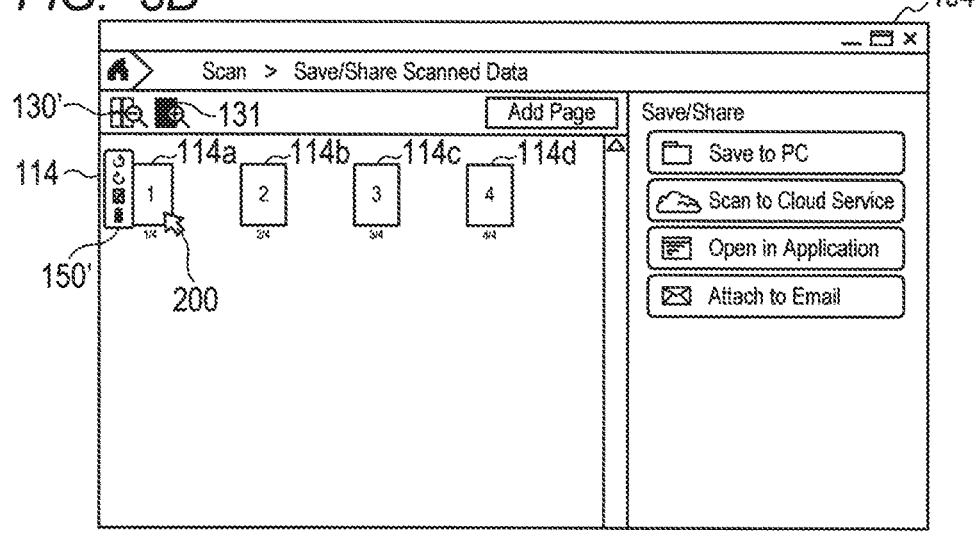

FIG. 3B illustrates, as in FIG. 3A, the scan-data saving screen 104 when the display frames 110a to 110d within the preview display region 110 of FIG. 2A are reduced to the minimum size. However, FIG. 3B is different from FIG. 3A in how the icons 150a to 150d included in the icon group 150 are arranged. Specifically, FIG. 3A shows the icon group 150 in which the upper row has the counterclockwise rotation icon 150c and clockwise rotation icon 150d arranged laterally while the lower row has the insertion icon 150a and deletion icon 150b arranged laterally to thereby provide a square-like shape. On the other hand, FIG. 3B illustrates the icon group 150' in which the counterclockwise rotation icon 150c, the clockwise rotation icon 150d, the insertion icon 150a, and the deletion icon 150b are arranged to form one column from the top to thereby provide a vertically long strip shape. The icon group 150' displayed in such a vertically long strip shape is for the purpose of allowing the user to know the content (outline content) of the displayed image of the display frame 114a even when display frame 114a is reduced to the minimum size.

Figure 3C:
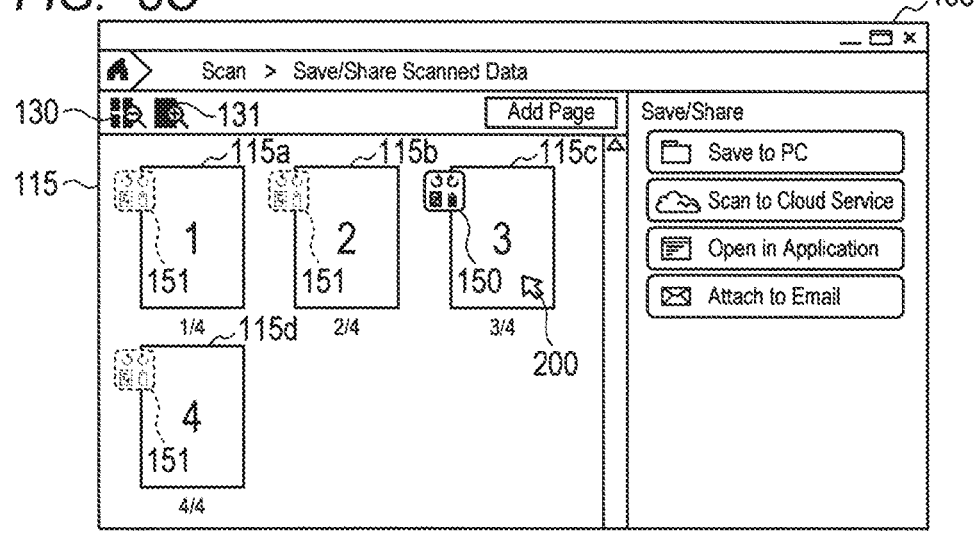

FIG. 3C illustrates a scan-data saving screen 105 in which the icon group 150 is displayed in a different manner from that of the scan-data saving screen 100 of FIG. 2A. In the scan-data saving screen 105 of FIG. 3C, the display frame 115c is moused over in the same way as in the scan-data saving screen 100 of FIG. 2A. However, the scan-data saving screen 105 of FIG. 3C is different from the scan-data saving screen 100 of FIG. 2A in that an icon group 151 is displayed on the display frames 115a, 115b, and 115d that are not moused over. The icon groups 151 are displayed in grayscale in order to show that it is a state where the display frames 115a, 115b, and 115d are not moused over. By displaying the icon groups 151 on the display frames 115a, 115b, and 115d that are not moused over, the user can visually recognize that various operations allocated to the respective icons included in the icon groups 151 can also be performed on the display frames 115a, 115b, and 115d. This consequently improves user operability.

Figure 4:
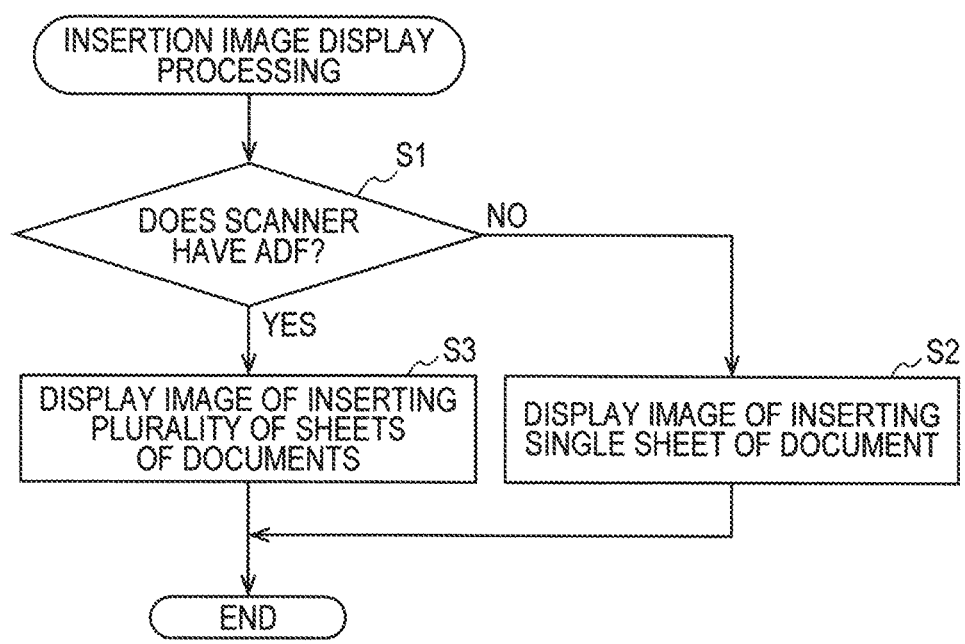
FIG. 4 is a flowchart showing steps of insertion-image display processing executed by a PC in FIG. 1, specifically, by a CPU.

The insertion-image display processing in FIG. 4 is executed when the cursor 200 points to the position of the insertion icon 150a. In the following descriptions for each processing, "step" is abbreviated as "S".

In FIG. 4, the CPU 12 firstly determines whether the scanner 30 has an ADF (Auto Document Feeder) (S1). Before connecting to the scanner 30, the PC 10 communicates with the scanner 30 to acquire the communication network address of the scanner 30 and the functions of the scanner 30, for example. The determination in S1 is performed based on the information regarding the scanner 30 acquired in the manner described above.

When it is determined in S1 that the scanner 30 does not have an ADF (S1: NO), the CPU 12 displays a graphic image depicting the insertion of a single document (a single sheet) on the panel 16 (S2), and subsequently ends the insertion-image display processing.

When it is determined in S1 that the scanner 30 has an ADF (S1: YES), the CPU 12 displays a graphic image depicting the insertion of a plurality of documents (a plurality of sheets) on the panel 16 (S3), and subsequently ends the insertion-image display processing.

Figure 5A:
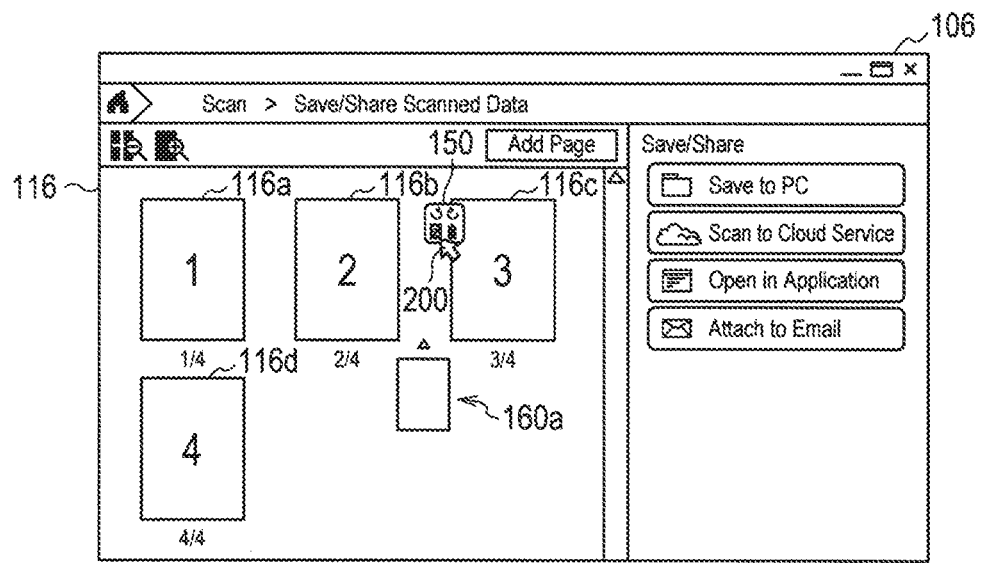
FIGS. 5A and 5B show examples of the scan-data saving screen when the insertion-image display processing in FIG. 4 is executed.

FIG. 5A illustrates a scan-data saving screen 106 on which a graphic image 160a for the insertion of a single document is displayed. As shown in FIG. 5A, the graphic image 160a is displayed between the display frame 116c on which the icon group 150 is displayed and the display frame 116b immediately before the display frame 116c. If new scan data is generated, anew display frame to display the new scan data is displayed between the display frame 116b and the display frame 116c. As shown in FIG. 5A, the graphic image 160a is displayed when the cursor 200 is pointing to the position of the insertion icon 150a in the icon group 150. This also applies to other graphic images 160b, 170, and 170' (see FIG. 5B and FIG. 9C).

Figure 5B:
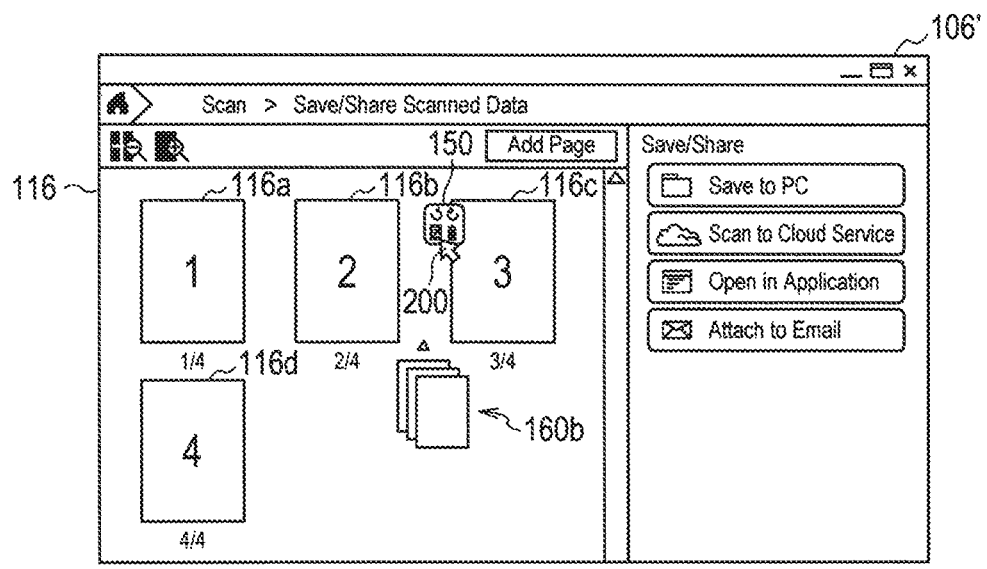

FIG. 5B illustrates a scan-data saving screen 106' on which a graphic image 160b for the insertion of a plurality of documents (a plurality of sheets) is displayed. The graphic image 160b is similarly displayed, as shown in FIG. 5B, between the display frame 116c on which the icon group 150 is displayed and the display frame 116b immediately before the display frame 116c. The graphic image 160b shows that there is a possibility that a plurality of documents may be read by the ADF.

Figure 6:
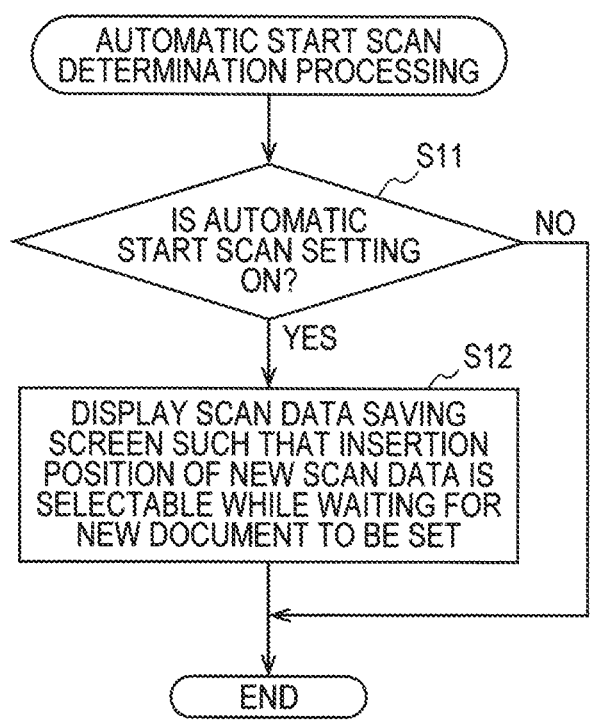
FIG. 6 is a flowchart showing steps of automatic start scan determination processing executed by the PC in FIG. 1, specifically, by the CPU.

In automatic start scan determination processing shown in FIG. 6, the term "automatic start scan" means a function to, when the user sets one sheet of document on the scanner 30, automatically start scanning of the set document by the scanner 30 to generate scan data. As described above, in this embodiment, the scan data generated by the scanner 30 is sent from the scanner 30 to the PC 10.

In FIG. 6, the CPU 12 firstly determines whether the automatic start scan setting is in an ON state (S11). The automatic start scan setting can be performed by the PC 10 side. The ON/OFF information for the automatic start scan setting is stored in the data storage region 28 and is sent from the PC 10 to the scanner 30. The scanner 30 enables or disables the automatic start scan based on the ON/OFF information of the automatic start scan setting.

When it is determined in S11 that the automatic start scan setting is in the OFF state (S11: NO), the CPU 12 ends the automatic start scan determination processing.

When it is determined in S11 that the automatic start scan setting is in the ON state (S11: YES), the CPU 12 displays the scan-data saving screen such that the insertion position of new scan data is selectable while waiting for a new document to be set (S12), and subsequently ends the automatic start scan determination processing.

Figure 7A:
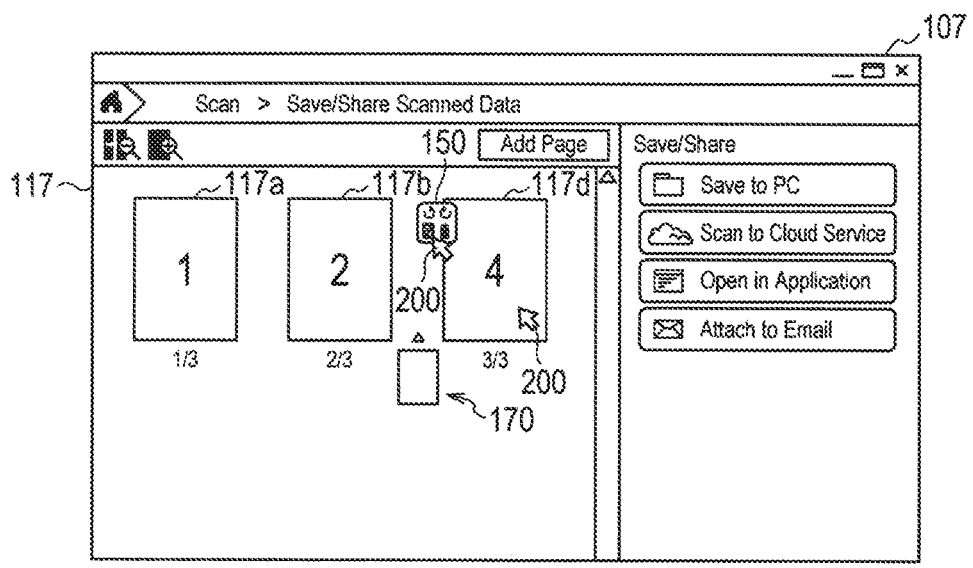
FIGS. 7A and 7B show examples of the scan-data saving screen when the automatic start scan determination processing in FIG. 6 is executed.
Figure 7B:
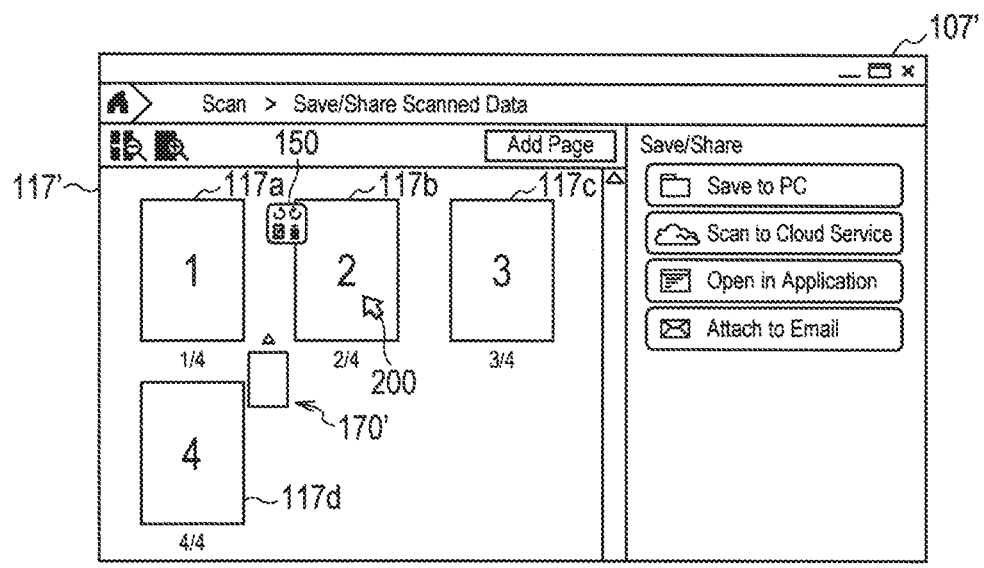

To summarize, in a case where the automatic start scan setting is OFF, when the cursor 200 is pointing to the position of the insertion icon 150*a* of the icon group 150, the graphic image 160*a* or 160*b* for insertion is displayed (FIGS. 5A, 5B). Then, in response to an operation (click) of the insertion icon 150*a*, a scan command is transmitted to the scanner 30 and scanning is performed. In a case where the automatic start scan setting is ON, the user operates the cursor 200 to mouse over one of the display frames, and then the graphic image 170 or 170' indicative of the insertion position is displayed (FIGS. 7A, 7B). When the user sets one sheet of document on the scanner 30 in this state, the scanner 30 automatically starts scanning of the document. That is, when the automatic start scan setting is ON, the user does not need to operate (click) the insertion icon 150*a*.

FIGS. 7A and 7B show one example of a scan-data saving screen after the automatic start scan determination processing is executed.

FIG. 7A illustrates that the display frame 117*d* is moused over in a state where the automatic start scan setting is set to ON and three display frames 117*a*, 117*b*, and 117*d* are displayed within the preview display region 117. Here, when the icon group 150 is displayed in the display frame 117*d* and the scanner 30 waits for a new document to be set, a display 170 showing the insertion position of new scan data is displayed between the display frame 117*b* and the display frame 117*d*.

FIG. 7B illustrates a state where the display frame 117*b* is moused over after a new display frame 117*c* is formed within the preview display region 117 of FIG. 7A and an image related to new scan data is displayed on the display frame 117*c*. Then, when the cursor 200 is moved from the display frame 117*c* to the display frame 117*b*, a display 170' showing the insertion position of the next new scan data is also moved from a position between the display frame 117*b* and the display frame 117*d* to a position between the display frame 117*a* and the display frame 117*b*.

As described above, when the automatic start scan is set to ON, the user can freely select the insertion position of the image related to the document for each document set for the next scan.

Figure 8:
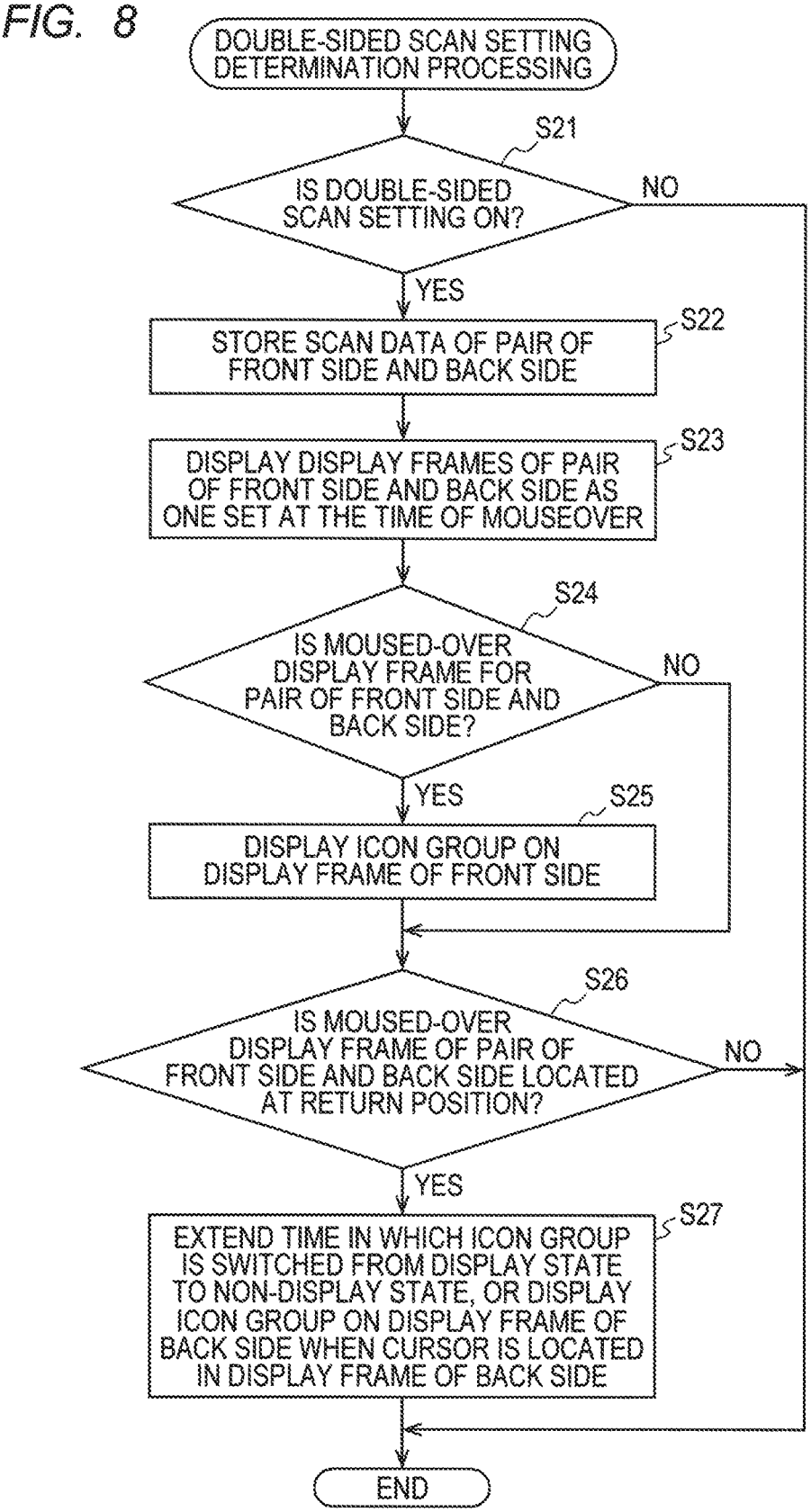
FIG. 8 is a flowchart showing steps of double-sided scan setting determination processing executed by the PC in FIG. 1, specifically, by the CPU.

In the double-sided scan setting determination processing shown in FIG. 8, the term "double-sided scan setting" is a setting to cause the scanner 30 to scan both sides of a document to generate scan data for each of a front side and a back side. The double-sided scan setting can be set on the PC 10 side.

In FIG. 8, the CPU 12 firstly determines whether the double-sided scan setting is in the ON state (S21). When it is determined that the double-sided scan setting is in the OFF state (S21: NO), the CPU 12 ends the double-sided scan setting determination processing.

When it is determined in S21 that the double-sided scan setting is in the ON state (S21: YES), the CPU 12 stores the scan data for the pair of the front side and the back side (S22).

Figure 9A:
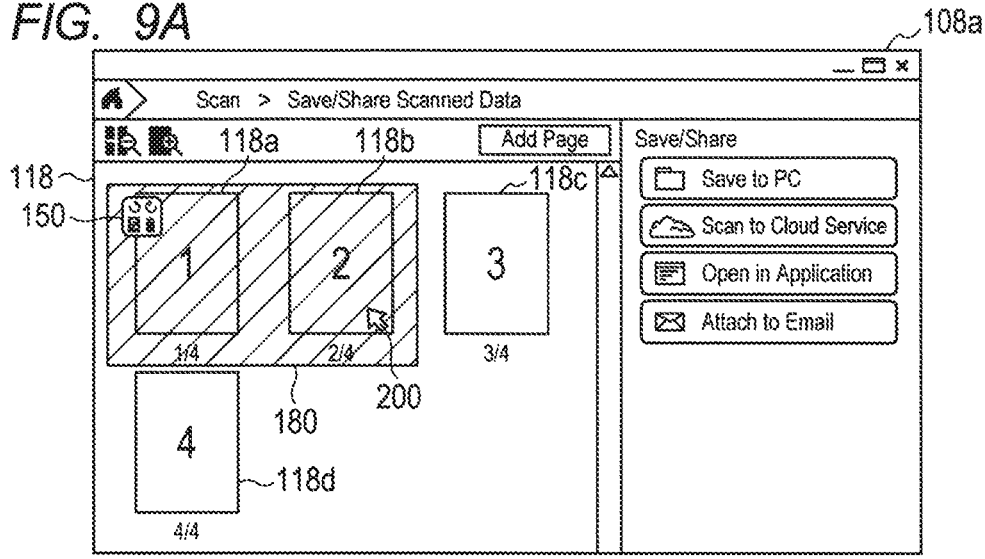
FIGS. 9A to 9C show examples of the scan-data saving screen when the double-sided scan setting determination processing in FIG. 8 is executed.

Next, the CPU 12 displays the display frame of the pair of the front side and the back side as one set in a highlighted manner when the display frame is moused over (S23). FIG. 9A illustrates the display frame of the pair of the front side and the back side displayed in a highlighted manner. In the example of FIG. 9A, the display frame 118*a* and the display frame 118*b* correspond to the display frame of the pair of the front side and the back side. Thus, a rectangular region (rectangular frame) 180 including the display frames 118*a* and 118*b* is displayed in a highlighted manner. In FIG. 9A (as well as FIGS. 9B and 9C), the highlighted display is expressed by oblique lines. The representation of the highlighted display is not limited to oblique lines and may also be represented in other ways such as having a different display color from that of the background color, so long as it is displayed in a way that is a clear representation of the display frame of the pair of the front side and the back side. Alternatively, the display frames 118*a* and 118*b* may be surrounded by a frame. In this case, the frame may be colored in a conspicuous color (for example, red). In other words, the display frame of the pair of the front side and the back side may be displayed in any manner so long as the user can recognize its existence during mouseover.

Returning to FIG. 8, the CPU 12 subsequently determines whether the moused-over display frame is the display frame of the pair of the front side and the back side (S24). When it is determined that the moused-over display frame is the display frame of the pair of the front side and the back side (S24: YES), the CPU 12 displays the icon group on the display frame of the front side (S25), and the processing subsequently proceeds to S26. In the example of FIG. 9A, the icon group 150 is displayed in the display frame 118*a* of the front side among the display frames 118*a* and 118*b* of the pair of the front side and the back side.

When it is determined in S24 that the moused-over display frame is not the display frame of the pair of the front side and the back side (S24: NO), the CPU 12 moves the processing to S26.

In S26, the CPU 12 determines whether the moused-over display frame of the pair of the front side and the back side is located at a return position. The term "return position" means the right end of a preview display region and indicates a state in which the display frame of the front side and the display frame of the back side are divided by the right end of the preview display region (that is, a state in which the display frame of the back side is displayed at the start of the row below the row of the display frame of the front side).

When it is determined in S26 that the moused-over display frame of the pair of the front side and the back side is located at the return position (S26: YES), the CPU 12 extends time in which the icon group is switched from a display state to a non-display state, or display the icon group on the display frame of the back side (S27) when the cursor 200 is located in the display frame of the back side (FIG. 9C). Then, the CPU 12 ends the double-sided scan setting determination processing.

When it is determined in S26 that the moused-over display frame of the pair of the front side and the back side is not located at the return position (S26: NO), the CPU 12 ends the double-sided scan setting determination processing.

Figure 9B:
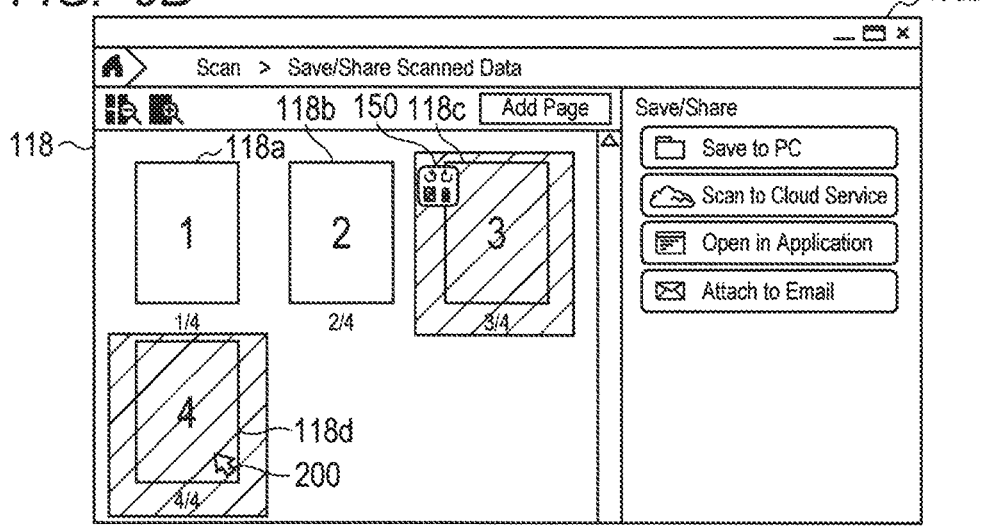
Figure 9C:
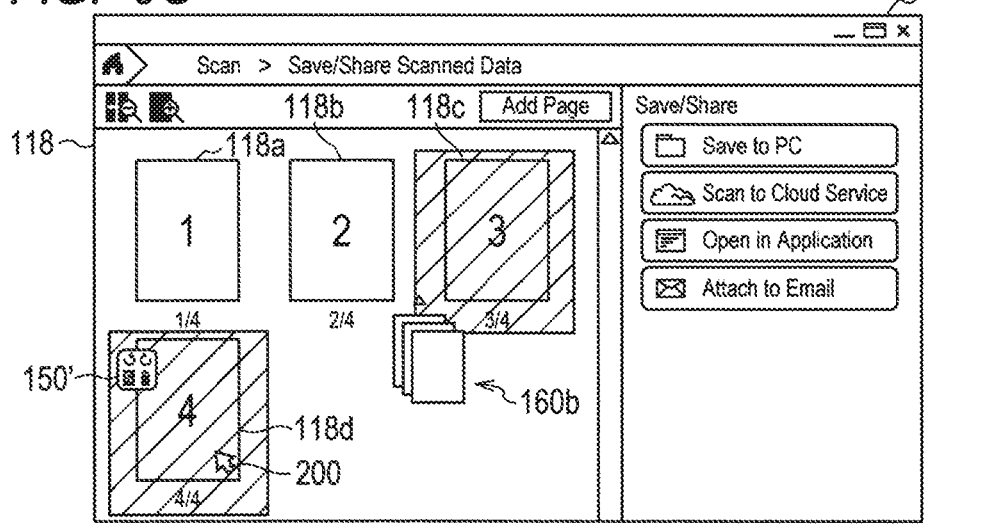

FIG. 9B illustrates a scan-data saving screen 108*b* after executing, among the processing of S27, the processing of extending the time in which the icon group is switched from the display state to the non-display state. After the cursor 200 separates from a display frame, the CPU 12 switches the icon group 150 from a display state to a non-display state in a particular time. In the example of FIG. 9B, display frames 118c and 118d of the pair of the front side and the back side are located at the return position. The time in which the CPU 12 switches the icon group 150 from a display state to a non-display state (a hidden state) after the cursor 200 separates from the display frames 118c and 118d of the pair of the front side and the back side is set to be longer than the time in which the CPU 12 switches the icon group 150 from a display state to a non-display state after the cursor 200 separates from a display frame that is not the pair of the front side and the back side (for example, the display frame 110c of the above FIG. 2A). The reason of extending the time to switch from the display state to the non-display state is as follows. Specifically, as shown in FIG. 9B, when the user moves the cursor 200 on the display frame 118d of the back side to the position of an icon in the icon group 150, the cursor 200 once separates from the display frame 118d, becomes a state where neither display frame is moused over, becomes a state where the display frame 118c is moused over, and then reaches the icon group 150. At this time, the icon group 150 sometimes repeats a display state and a non-display state, thereby preventing the user from promptly moving the cursor 200 to the position of the icon group 150. Therefore, by extending the time in which the icon group 150 becomes the non-display state after neither display frame is moused over, the icon group 150 can be displayed at least until the user moves the cursor 200 to the icon group 150.

FIG. 9C illustrates a scan-data saving screen 108c after executing, among the processing of S27, the processing of displaying the icon group on the display frame of the back side. As shown in FIG. 9C, by displaying the icon group 150 on the display frame 118d of the back side when the cursor 200 is on the display frame 118d of the back side, the user can move the cursor 200 to the icon group 150 before the icon group 150 becomes a non-display state. In this case, a state in which neither display frame is moused over does not occur before the cursor 200 reaches the icon group 150. In the preview display region 118 of FIG. 9C, the graphic image 160b for the insertion of a plurality of documents is also displayed. Although in FIG. 9C the cursor 200 is not pointing to the insertion icon, actually, the graphic image 160b is displayed when the cursor 200 is pointing to the insertion icon.

As described above, the control program 26 of the present embodiment causes the PC 10 that performs communication with the scanner 30 configured to scan an image of a document to perform: screen display processing of displaying, on the panel 16 of the PC 10, the preview display region 110 formed by sequentially arranging images of documents read by the scanner 30 at each of the 2×3 display frames 110a to 110d arranged two vertically and three horizontally; icon display processing of displaying the insertion icon 150a for instructing insertion at a left-side position with respect to the center of the display frames 110a to 110d in the left-right direction (horizontal direction) which is displayed within the preview display region 110 by the screen display processing; insertion processing of, in response to an operation of the insertion icon 150a displayed by the icon display processing, controlling the scanner 30 to scan an image of a new document, and inserting the scanned image to the position that is immediate left of one of the display frames 110a to 110d corresponding to the operated insertion icon 150a.

Thus, with the control program 26 of the present embodiment, it can be understood intuitively at which position an image scanned from a new document should be inserted. This further improves operability of inserting, into the preview display region 110, the image of the document that is newly scanned by the scanner 30.

In the present embodiment, the control program 26 is one example of "information processing program". The scanner 30 is one example of "image scanner". The PC 10 is one example of "information processing apparatus". The number "2" is one example of M. The number "3" is one example of N. The preview display region 110 is one example of "scan result screen". The panel 16 is one example of "display".

The icon display processing further causes the PC 10 to execute deletion processing of displaying the deletion icon 150b for instructing deletion to immediate right of the insertion icon 150a and of deleting, in response to an operation of the deletion icon 150b displayed by the icon display processing, the image within the display frame corresponding to the deletion icon 150b.

This makes easy the operation of deleting an image that is already displayed, not only inserting an image of a new document. Further, displaying the insertion icon 150a at the left side makes easy to understand that an image is added to the front (left) of the image in the display frame, and displaying the deletion icon 150b at the right side makes easy to understand that the image in the display frame is deleted.

In response to the insertion processing, the screen display processing increases at least the number of M frames arranged vertically or the number of N frames arranged horizontally. In contrast, in response to the deletion processing, the screen display processing decreases neither the number of M frames arranged vertically nor the number of N frames arranged horizontally.

This prevents a situation that it is difficult for the user to know that an image is deleted due to a change of M×N by the deletion processing.

The icon display processing displays the clockwise rotation icon 150d immediately above or immediately below the insertion icon 150a, displays the counterclockwise rotation icon 150c immediately above or immediately below the deletion icon 150b, and displays the counterclockwise rotation icon 150c to immediate left of the clockwise rotation icon 150d. The screen display processing displays the preview display region 110 while changing the screen size of the preview display region 110. As the screen size of the preview display region 110 becomes smaller, the screen display processing displays the display frame in a smaller size. The size of the icon group 150 including the clockwise rotation icon 150d, the counterclockwise rotation icon 150c, the insertion icon 150a, and the deletion icon 150b is unchanged even when the display frame is displayed in a smaller size.

In this way, the size of the icon group 150 is unchanged even when the display frame is displayed in a smaller size, which suppresses worsening of the operability to each icon included in the icon group 150.

When the display frame is displayed in a smaller size, the icon display processing displays the icon group 150 in a state where a part of icons included in the icon group 150 is moved such that the icons are arranged vertically.

This suppresses a situation that the icon group 150 gets in the way and the content (outline content) of the display image within the display frame cannot be seen. Further, the preview display region 110 can be utilized efficiently.

The control program 26 further causes the PC 10 to execute cursor display processing of displaying a cursor for indicating the display object within the preview display region 110, and the icon display processing displays the icon when the cursor 200 is located in the display frame.

Because the icon is not displayed constantly, the preview display region 110 can be utilized effectively.

The control program 26 further causes the PC 10 to execute cursor display processing of displaying the cursor 200 for indicating the display object within the preview display region 110. The icon display processing displays the icon lightly (for example, in grayscale or in dotted lines, "first display mode") when the cursor 200 is not located in the display frame, and displays the icon clearly or in a more visible manner (for example, in solid lines, "second display mode") when the cursor 200 is located in the display frame.

Thus, because the icon is displayed lightly in the display frame where the cursor 200 is not located, the user can always easily grasp the existence of the icon.

The control program 26 further causes the PC 10 to execute insertion-position display processing of displaying the insertion position of an image by insertion processing, displaying an image indicative of a plurality of sheets of documents when the scanner 30 has an ADF function, and displaying an image indicative of a single sheet of document when the scanner 30 has no ADF function.

This enables the user to visually grasp what the display results on the preview display region 110 will be like when an image or images are inserted.

In a case where two images displayed in the preview display region 110 are pair images that are scanned by performing double-sided scan with the scanner 30, the icon display processing displays the icon on the display frame of the image corresponding to the front side, instead of displaying the icon on the display frame of the image corresponding to the back side.

This is because it is preferable that, when the pair images are displayed, an image of a new document be inserted between a document and another document.

The screen display processing performs at least displaying pair images surrounded by one frame, or displaying the display frame of the pair images in a highlighted manner.

This enables the user to visually grasp that the display image is pair images.

In a case where pair images are arranged to straddle the return position of the preview display region 110, the icon display processing displays the icon on the display frame of the image corresponding to the back side when the cursor 200 is located on the display frame of the image corresponding to the back side.

Thus, even when pair images are arranged to straddle the return position of the preview display region 110, the operability for the icon does not worsen.

Alternatively, in a case where pair images are arranged to straddle the return position of the preview display region 110, the icon display processing extends the time in which the icon is hidden after the cursor 200 separates from the display frame of the pair images.

Thus, even when pair images are arranged to straddle the return position of the preview display region 110, the operability for the icon does not worsen.

While the disclosure has been described in detail with reference to the above aspects thereof, it would be apparent to those skilled in the art that various changes and modifications may be made therein without departing from the scope of the claims.

(1) For example, in the above-described embodiment, the scanner 30 is connected to the PC 10 through the network interface 20 and the router 32 through the communication network. Alternatively, the scanner 30 may be connected directly to the PC 10 through a USB (Universal Serial Bus), for example, not through the communication network.

(2) In the above-described embodiment, the scanner 30 has mainly only a scan function. Alternatively, a multifunction peripheral (MFP) having a scan function may be adopted.

(3) In the above-described embodiment, only one scanner 30 is connected to the PC 10. Alternatively, a plurality of scanners may be connected to the PC 10, and the information processing program may be configured such that one of the plurality of scanners can be selected. In this case, in addition to the scanners, MFPs may be connected as the target to be selected.

What is claimed is:

1. A non-transitory computer-readable storage medium storing a set of program instructions for an information processing apparatus configured to communicate with an image scanner, the set of program instructions, when executed by a controller of the information processing apparatus, causing the information processing apparatus to:
  display, on a display of the information processing apparatus, a scan result screen formed by sequentially arranging images of documents scanned by the image scanner at respective ones of M×N display frames, the M×N display frames including M display frames arranged vertically and N display frames arranged horizontally;
  display an icon group at a left-side position with respect to a center of a selected display frame in a horizontal direction, the selected display frame being one of the M×N display frames, the selected display frame being selected on the display through a user interface of the information processing apparatus, the icon group including an insertion icon and a deletion icon, the deletion icon being displayed to an immediate right of the insertion icon;
  in response to an operation of the insertion icon, control the image scanner to scan an image of a new document, and insert the scanned image to a position that is immediate left of the selected display frame; and
  in response to an operation of the deletion icon, delete an image in the selected display frame.

2. The non-transitory computer-readable storage medium according to claim 1, wherein the set of program instructions, when executed by the controller, causes the information processing apparatus to:
  in response to inserting the scanned image, increase at least a number of the M display frames arranged vertically or a number of the N display frames arranged horizontally; and
  in response to deleting the image, decrease neither the number of the M display frames arranged vertically nor the number of the N display frames arranged horizontally.

3. The non-transitory computer-readable storage medium according to claim 1, wherein the set of program instructions, when executed by the controller, causes the information processing apparatus to:
  display a counterclockwise rotation icon immediately above or immediately below the insertion icon;

display a clockwise rotation icon immediately above or immediately below the deletion icon, the clockwise rotation icon being immediate right of the counterclockwise rotation icon;

change a screen size of the scan result screen;

as the screen size of the scan result screen is reduced, display the M×N display frames in a smaller size; and when the M×N display frames are displayed in the smaller size, keep a size of the icon group including the counterclockwise rotation icon, the clockwise rotation icon, the insertion icon, and the deletion icon.

4. The non-transitory computer-readable storage medium according to claim 3, wherein the set of program instructions, when executed by the controller, causes the information processing apparatus to:

when the M×N display frames are displayed in the smaller size, display the icon group such that the counterclockwise rotation icon, the clockwise rotation icon, the insertion icon, and the deletion icon are arranged vertically.

5. The non-transitory computer-readable storage medium according to claim 1, wherein the set of program instructions, when executed by the controller, causes the information processing apparatus to:

display a cursor for indicating a display object within the scan result screen; and display the icon group when the cursor is located in the selected display frame.

6. The non-transitory computer-readable storage medium according to claim 1, wherein the set of program instructions, when executed by the controller, causes the information processing apparatus to:

display a cursor for indicating a display object within the scan result screen; and display the icon group in a first display mode when the cursor is not located in a display frame, and displaying the icon group in a second display mode when the cursor is located in the selected display frame, the icon group in the second display mode being more visible than the icon group in the first display mode.

7. The non-transitory computer-readable storage medium according to claim 1, wherein the set of program instructions, when executed by the controller, causes the information processing apparatus to:

display an insertion image indicative of an insertion position of a scanned image, the insertion image being indicative of a plurality of sheets of documents in a case where the image scanner has an ADF (Auto Document Feeder) function and being indicative of a single sheet of document in a case where the image scanner has no ADF function.

8. A non-transitory computer-readable storage medium storing a set of program instructions for an information processing apparatus configured to communicate with an image scanner, the set of program instructions, when executed by a controller of the information processing apparatus, causing the information processing apparatus to:

display, on a display of the information processing apparatus, a scan result screen formed by sequentially arranging images of documents scanned by the image scanner at respective ones of M×N display frames, the M×N display frames including M display frames arranged vertically and N display frames arranged horizontally;

display an insertion icon at a left-side position with respect to a center of a display frame in a horizontal direction, the display frame being one of the M×N display frames;

in response to an operation of the insertion icon, control the image scanner to scan an image of a new document, and insert the scanned image to a position that is immediate left of the display frame corresponding to the operated insertion icon; and in a case where two images displayed in the scan result screen are pair images that are obtained by performing double-sided scanning with the image scanner, display the insertion icon on a display frame of an image corresponding to a front side of a double-sided document, without displaying the insertion icon on a display frame of an image corresponding to a back side of the double-sided document.

9. The non-transitory computer-readable storage medium according to claim 8, wherein the set of program instructions, when executed by the controller, causes the information processing apparatus to:

at least display the pair images surrounded by one frame or display the display frames of the pair images in a highlighted manner.

10. The non-transitory computer-readable storage medium according to claim 8, wherein the set of program instructions, when executed by the controller, causes the information processing apparatus to:

display a cursor for indicating a display object within the scan result screen; and in a case where the display frame of the image corresponding to the front side is located at a right end of a particular row and the display frame of the image corresponding to the back side is located at a left end of a next row below the particular row, display the insertion icon on the display frame of the image corresponding to the front side when the cursor is located on the display frame of the image corresponding to the front side, and display the insertion icon on the display frame of the image corresponding to the back side when the cursor is located on the display frame of the image corresponding to the back side.

11. The non-transitory computer-readable storage medium according to claim 8, wherein the set of program instructions, when executed by the controller, causes the information processing apparatus to:

in a case where the display frame of the image corresponding to the front side is located at a right end of a particular row and the display frame of the image corresponding to the back side is located at a left end of a next row below the particular row, extend a time in which the insertion icon is changed from a display state to a non-display state after the cursor separates from the display frame of one of the pair images.

12. The non-transitory computer-readable storage medium according to claim 1, wherein the set of program instructions, when executed by the controller, causes the information processing apparatus to:

display the icon group on a left edge of the selected display frame.

13. The non-transitory computer-readable storage medium according to claim 1, wherein the set of program instructions, when executed by the controller, causes the information processing apparatus to:

when an automatic resizing function is enabled, display the M×N display frames in a size optimal for a size of the scan result screen; and in response to deleting the image in the selected display frame, keep the size of the M×N display frames even when the automatic resizing function is enabled.

14. A non-transitory computer-readable storage medium storing a set of program instructions for an information processing apparatus configured to communicate with an image scanner, the set of program instructions, when executed by a controller of the information processing apparatus, causing the information processing apparatus to:

display, on a display of the information processing apparatus, a scan result screen formed by sequentially arranging images of documents scanned by the image scanner at respective ones of M×N display frames, the M×N display frames including M display frames arranged vertically and N display frames arranged horizontally;

display an insertion icon at a left-side position with respect to a center of a display frame in a horizontal direction, the display frame being one of the M×N display frames;

in response to an operation of the insertion icon, control the image scanner to scan an image of a new document, and insert the scanned image to a position that is immediate left of the display frame corresponding to the operated insertion icon;

determine whether an automatic start scan setting is ON or OFF;

in response to determining that the automatic start scan setting is OFF, when a cursor is pointing to the insertion icon, display an insertion image indicating a position that is immediate left of the display frame corresponding to the insertion icon, the insertion image being indicative of insertion of a scanned image, and in response to an operation of the insertion icon, transmit a scan command to the image scanner for performing scanning; and in response to determining that the automatic start scan setting is ON, when the cursor is located in one of the M×N display frames, display the insertion image indicating a position that is immediate left of the display frame in which the cursor is located; and in response to setting a document on the image scanner, control the image scanner to automatically scan the document without receiving an operation of the insertion icon.

15. An information processing apparatus comprising:
a communication interface configured to be connected to an image scanner;
a display;
a controller; and
a memory storing set of instructions, the instructions, when executed by the controller, causing the information processing apparatus to:

display, on the display, a scan result screen formed by sequentially arranging images of documents scanned by the image scanner at respective ones of M×N display frames, the M×N display frames including M display frames arranged vertically and N display frames arranged horizontally;

display an icon group at a left-side position with respect to a center of a selected display frame in a horizontal direction, the selected display frame being one of the M×N display frames, the selected display frame being selected on the display through a user interface of the information processing apparatus, the icon group including an insertion icon and a deletion icon, the deletion icon being displayed to an immediate right of the insertion icon;

in response to an operation of the insertion icon, control the image scanner to scan an image of a new document, and insert the scanned image to a position that is immediate left of the selected display frame; and in response to an operation of the deletion icon, delete an image in the selected display frame.

16. An information processing method comprising:

displaying, on a display of an information processing apparatus, a scan result screen formed by sequentially arranging images of documents scanned by an image scanner at respective ones of M×N display frames, the M×N display frames including M display frames arranged vertically and N display frames arranged horizontally, the image scanner being connected to a communication interface of the information processing apparatus for performing communication;

displaying an icon group at a left-side position with respect to a center of a selected display frame in a horizontal direction, the selected display frame being one of the M×N display frames, the selected display frame being selected on the display through a user interface of the information processing apparatus, the icon group including an insertion icon and a deletion icon, the deletion icon being displayed to an immediate right of the insertion icon; and in response to an operation of the insertion icon, controlling the image scanner to scan an image of a new document, and inserting the scanned image to a position that is immediate left of the selected display frame; and in response to an operation of the deletion icon, deleting an image in the selected display frame.

* * * * *

UNITED STATES PATENT AND TRADEMARK OFFICE
CERTIFICATE OF CORRECTION

PATENT NO. : 11,394,839 B2
APPLICATION NO. : 16/923296
DATED : July 19, 2022
INVENTOR(S) : Masafumi Kawaguchi It is certified that error appears in the above-identified patent and that said Letters Patent is hereby corrected as shown below:

In the Claims

Column 15, Claim 6, Line 38 should read:
cursor is not located in a display frame, and display Signed and Sealed this
Thirty-first Day of January, 2023

Katherine Kelly Vidal
*Director of the United States Patent and Trademark Office*